United States Patent
Pitner

[15] 3,660,989
[45] May 9, 1972

[54] UNIVERSAL JOINT

[72] Inventor: Alfred Pitner, Paris, France
[73] Assignee: Nadella, a part interest
[22] Filed: Dec. 8, 1969
[21] Appl. No.: 883,147

[30] Foreign Application Priority Data

Jan. 24, 1969 France..................................6901314

[52] U.S. Cl...............................................64/17, 308/207
[51] Int. Cl.............................................F16d 3/26
[58] Field of Search..................................64/17; 308/207

[56] References Cited

UNITED STATES PATENTS 2,689,468  9/1954  Potgieter..................................64/17
3,009,748  11/1961  Pitner......................................308/207

Primary Examiner—Mark M. Newman
Assistant Examiner—Randall Heald
Attorney—Robert E. Burns and Emmanuel J. Lobato

[57] ABSTRACT

Universal joint in which the needle bearing cup surrounding each trunnion of the cross member of the joint has a non-circular cross-sectional shape so that the passage for the needles is smaller in the zones in which the forces are transmitted by the joint than in the rest of the passage for the needles. This is achieved by an interaction between the branch of the material of the yoke surrounding the bore and the cup which deforms the cup in the desired manner. A method is disclosed for achieving this result.

2 Claims, 5 Drawing Figures

UNIVERSAL JOINT

The present invention relate to universal joints comprising two yokes and a cross member having four trunnions each of which is capped by a needle cup fitted in the bore of the corresponding yoke branch, and more particularly concerns the adjustment of the diametral clearance for the needles in the cups.

It is known that, on an industrial scale, it is impossible to produce a needle bearing in which the diametral clearance or play for the needles is zero at all points, which would be the ideal situation for the considered purpose. However, attempts have been made to approach this ideal situation by locally reducing the clearance. Thus, it has been proposed in the U.S. Pats. Nos. 2,983,560 and 3,009,748 to deform one of the raceways of the bearing so as to alternate circumferentially zones of reduced or zero clearance on a fixed or elastically yieldable support and zones of greater clearance.

As concerns needle cups of a universal joint, it is of interest to arrange that this clearance be small and even zero or negative in the zone in which the forces are transmitted. This is more particularly true in applications, as measuring and regulating apparatuses, in which the torques transmitted are relatively low in value but change in direction and in which it is important that the universal joint respond immediately to an input torque so that the output torque is transmitted without delay. Likewise, in a vehicle steering mechanism employing universal joints, absence of clearance in the direction of transmission of the steering force is is desirable so that the driver can always feel through his steering wheel the response of the steering road wheels of the vehicle to the effort he exerts on the steering wheel in either direction.

The invention provides a universal joint wherein the diametral clearance is small, and possibly zero or negative, in the zone of the circulation of the needles in which the driving forces are transmitted, the inner face of the cup constituting the raceway deviating on at least a fraction of its axial extent from the circular shape, the variable radius of curvature of the section of the cup being maximum in the zone of transmission of the forces. This non-circular shape is for example an oval whose major axis is in the plane of symmetry of the yoke and whose minor axis is perpendicular to said plane.

To construct such a universal joint, the branch of the yoke in which the bore is formed and the bore itself are so shaped that interaction between the material defining the bore and the cup, whose wall is initially cylindrical and which is a force fit in this bore, imparts the desired non-circular shape to the cup. This can be achieved by machining the bore in the form of a non-circular cylinder, for example having an oval section, corresponding to the desired shape for the cup.

U.S. Pat. No. 3,321,256 teaches the ovalizing of one of the rings of the bearings, and more particularly the inner bearing ring, so as to modify the clearance for the needles. In this known bearing, the object is to reduce the clearance in the plane perpendicular to the direction of transmission of the forces which is radically different from the object of the present invention, the arrangements according to the present invention resulting in an increase in the clearance in this plane.

Further features and advantages of the invention will be apparent from the ensuing description with reference to the accompanying drawing.

Figure 1:
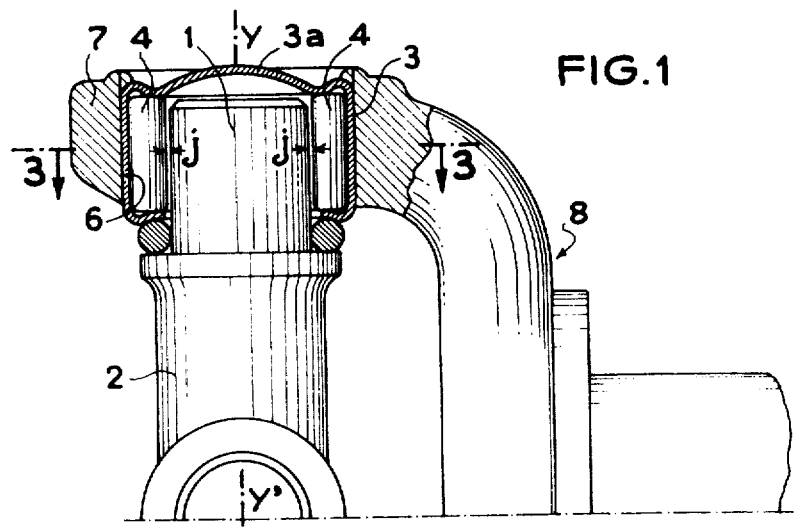
FIG. 1 shows, partly in elevation and partly in section, a universal joint in which the needle cup capping the trunnion is fitted in a bore in a yoke branch.

In the universal joint partly shown in FIG. 1, each of the trunnions 1 of the cross member 2 is capped by a cup 3 which encloses needles 4 and is fitted in the bore 6 of a branch 7 of a yoke 8.

Owing to the fact that the bore 6 has an oval shape or an elliptical shape (see FIG. 2) characterized by a half major axis $a_o$ contained in the plane of symmetry XX' of the yoke, the half minor axis $b_o$ being contained in the plane YY' perpendicular to the plane XX' in which the forces to be transmitted are applied, the cup 3 assumes, after having been force fitted in the bore, an oval shape defined by half axes $a$, $b$ (FIG. 3) contained in the plane of symmetry XX' and in the plane YY' respectively. Consequently, in the plane of symmetry XX', the needles have a clearance $j$ of positive value for their movement whereas in the plane of the applied forces YY' the clearance is zero of negative.

Figure 2:
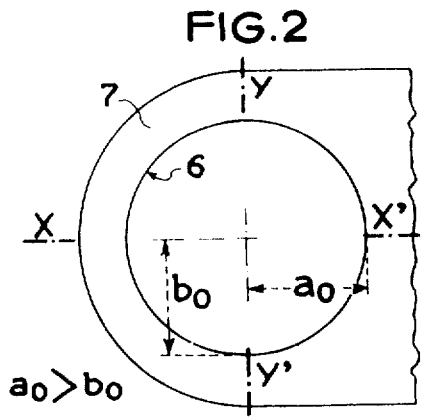
FIG. 2 is a partial plan view of the oval shape of the bore shown in FIG. 1.
Figure 3:
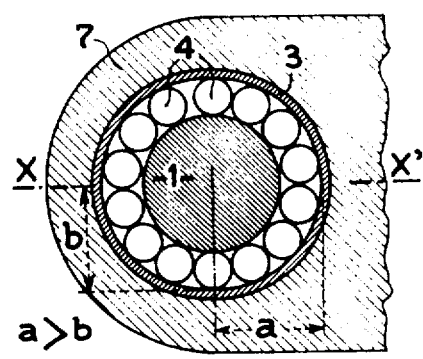
FIG. 3 is a sectional view taken along line 3—3 of FIG. 1.
Figure 4:
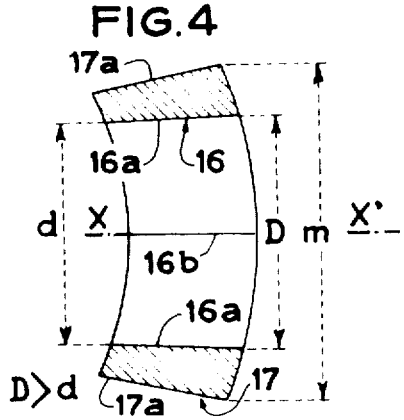
FIG. 4 is a sectional view in a plane perpendicular to the plane of symmetry of a yoke whose branches have the sectional shape of a segment of a cylinder.

Whereas, in FIGS. 1-3, the yoke branch 7 is assumed to have a flat or plane shape, the yoke branch shown in FIG. 4 has the shape of a segment of a cylinder whose axis is parallel to the axis of rotation of the yoke. This yoke may be produced, for example, by bending a plane strip in the manner taught by U.S. application Ser. No. 677,625 which defines in the branch 17 to plane lateral faces 17a, 17b which are convergent towards the axis of rotation of the yoke. Owing to this convergence, the dimension $m$ of the branch, measured in a direction perpendicular to the plane of symmetry XX', decreases along the axis of the bore in the direction of the convergence of the lateral faces 17a, 17b.

Consequently, if the bore 16 is machined, as by broaching, to the theoretical shape of a circular cylinder, the reaction of the material surrounding the bore varies along the axis of the latter, the material giving way more where the thickness of the material is less, that is, in the region of the branch nearer the axis of rotation of the yoke. Thus, the final shape of the bore is not that of a true circular cylinder.

More precisely, the bore generatrices 16a, 16a in the plane of FIG. 4, namely the plane perpendicular to the plane of symmetry XX', are not parallel but slightly convergent towards the axis of rotation of the yoke so that the diameter D of the bore on the convex face of the yoke branch 17 is larger than the diameter $d$ on the concave face, whereas the generatrices 16b, 16b in the plane of symmetry XX' are generally parallel generatrices. Thus, the bore tapers in the plane perpendicular to the plane of symmetry in the fraction of the axial extent of the yoke branch which is the nearer to the concave face of this branch. In other words, after the needle cup has been fitted in the bore by force, the clearance allowed for the movement of the needles is smaller than the clearance allowed in the plane of symmetry XX'.

Figure 5:
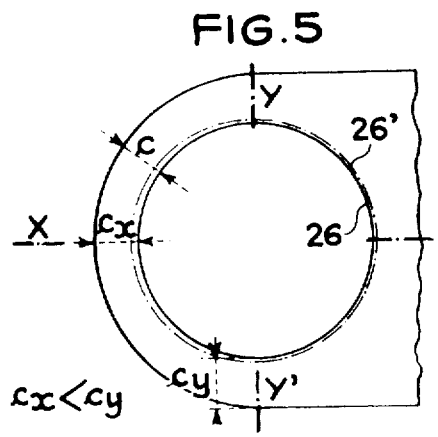
FIG. 5 is a partial plan view of a yoke branch similar to FIG. 2 showing a bore of circular shape.

In FIG. 5, the bore 26 of the yoke branch 27 is circular in the free state but the configuration of the yoke branch 27 is such that the thickness of material $c$, measured radially of the bore, between the bore face 26 and the outer face 27a of the branch 27 varies in such manner that the thickness $c_x$ in the plane of symmetry XX' is smaller than the thickness $c_y$ in the plane YY' perpendicular to the plane XX'. Consequently, the resistance opposed by the material of the yoke branch to the bearing cup-fitting stresses varies along the periphery of the bore and is less in the plane of symmetry XX', so that the deformation of the material in this plane is greater. This results in an ovalization of the bore indicated by the dot-dash line 26' (FIG. 5) which represents the deformed bore.

It will be understood that to ovalize the needle cup it is possible to employ simultaneously more than one of the means described hereinbefore or, if desired, all of these means. These means are moreover merely illustrative and others may be employed. Thus, the end wall 3a of the cup 3 may be given such shape that it performs the function of a stiffener for the cup so that the stiffness of this end wall is increased in a privileged direction, for example by providing a stiffening rib in the end wall 3a in a plane coinciding with the plane of symmetry XX' of the yoke so that the deformation of the bore is greater in this plane upon fitting the needle cup in the bore, which produces the desired increase in the clearance for the movement of the needles.

It is also possible, after having produced a bore having a circular cylindrical shape, to press-deform the corresponding yoke branch so as to ovalize the bore.

Although specific embodiments of the invention have been described, many modifications and changes may be made therein without departing from the scope of the invention.

Having now described my invention what I claim and desire to secure by Letters Patent is:

1. In a universal joint comprising a cross member having four trunnions, two yokes respectively having an axis of rotation and two branches contained in a plane containing said axis and means defining a bore having a smooth and even face in each branch for receiving a corresponding one of said trunnions; the structure comprising a needle bearing for each of said trunnions, said needle bearing comprising a cup having an initially cylindrical body portion which is of thin flexible metal and is engaged in the corresponding bore and is entirely coextensive with and adjoins the face of the bore said body portion having an inner face constituting a raceway defining an annular passage with the trunnion, and bearing needles disposed in said passage for circulation therein, said face of the bore having a cross-sectional shape which deviates from a circular shape in at least a portion of the axial extent of said face of the bore, said body portion engaged in said bore having exactly the same shape as said bore, and said cross-sectional shape being such that in two opposed zones of said passage in which driving forces are transmitted by said universal joint said passage has a radial width which is narrower than the radial width of the rest of said passage, said inner face of said body portion having a flatter curvature in said zones than elsewhere.

2. The structure claimed in claim 1, wherein the cross sections of the bore and cup in at least a portion of the axial extent thereof have substantially the shape of an ellipse having a major axis in said plane and a minor axis perpendicular to said plane.

* * * * *

UNITED STATES PATENT OFFICE
CERTIFICATE OF CORRECTION

Patent No. 3,660,989      Dated May 9, 1972

Inventor(s) ALFRED PITNER

It is certified that error appears in the above-identified patent and that said Letters Patent are hereby corrected as shown below:

In the Heading to the Patent change item "[73] ASSIGNEE"

to read as follows:

--[73] Assignee:   NADELLA
                           RUEIL-MALMAISON, FRANCE
                           Undivided one-half interest--

Signed and sealed this 11th day of June 1974.

(SEAL)
Attest:

EDWARD M. FLETCHER, JR.
Attesting Officer

C. MARSHALL DANN
Commissioner of Patents